Oct. 6, 1959     J. D. RUSSELL     2,907,481
LOADING APPARATUS FOR TUNNEL WORK
Original Filed Aug. 4, 1952     9 Sheets-Sheet 1
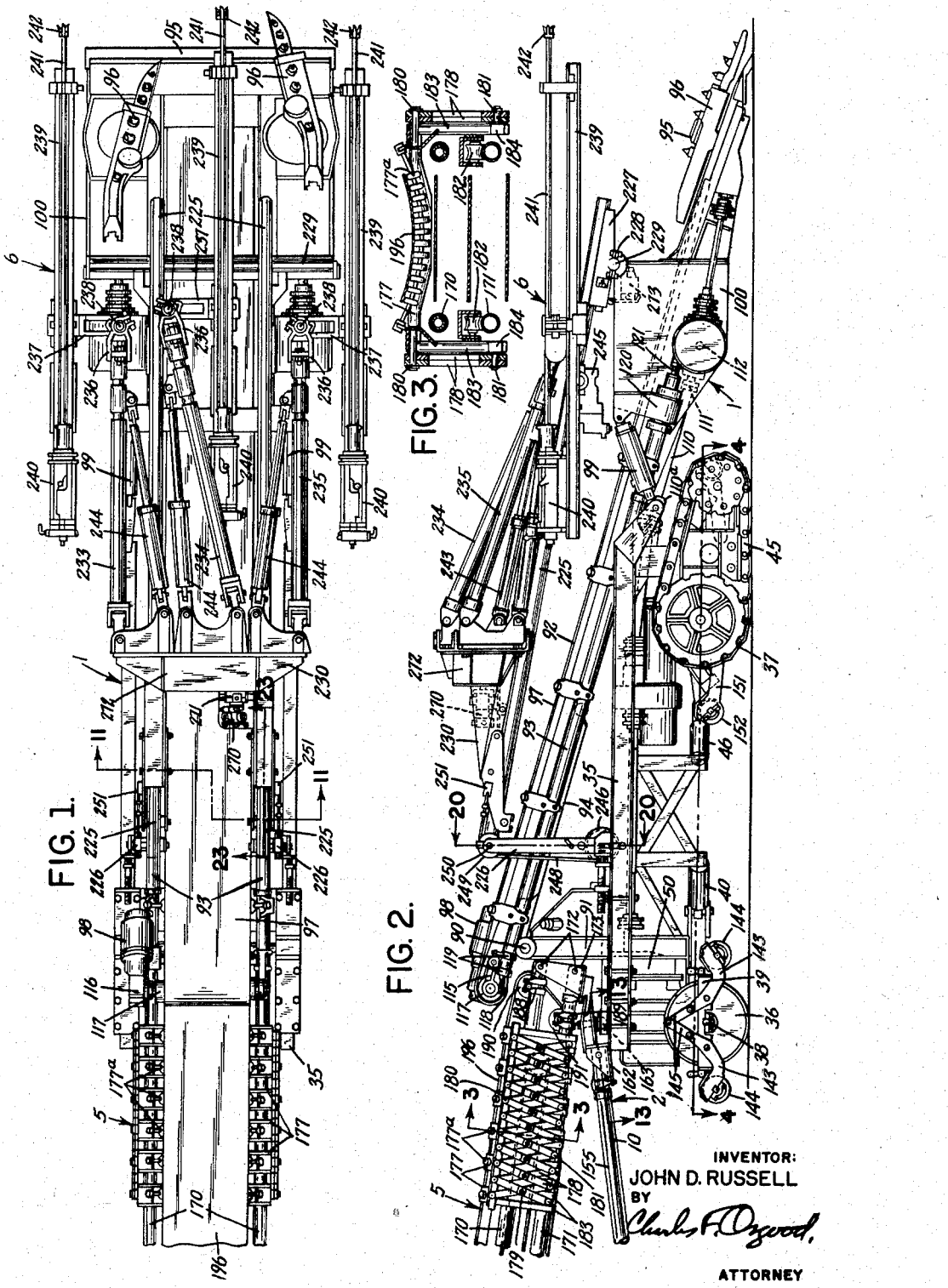
INVENTOR:
JOHN D. RUSSELL
BY
*Charles F. Osgood*
ATTORNEY Oct. 6, 1959  J. D. RUSSELL  2,907,481
LOADING APPARATUS FOR TUNNEL WORK
Original Filed Aug. 4, 1952  9 Sheets-Sheet 2
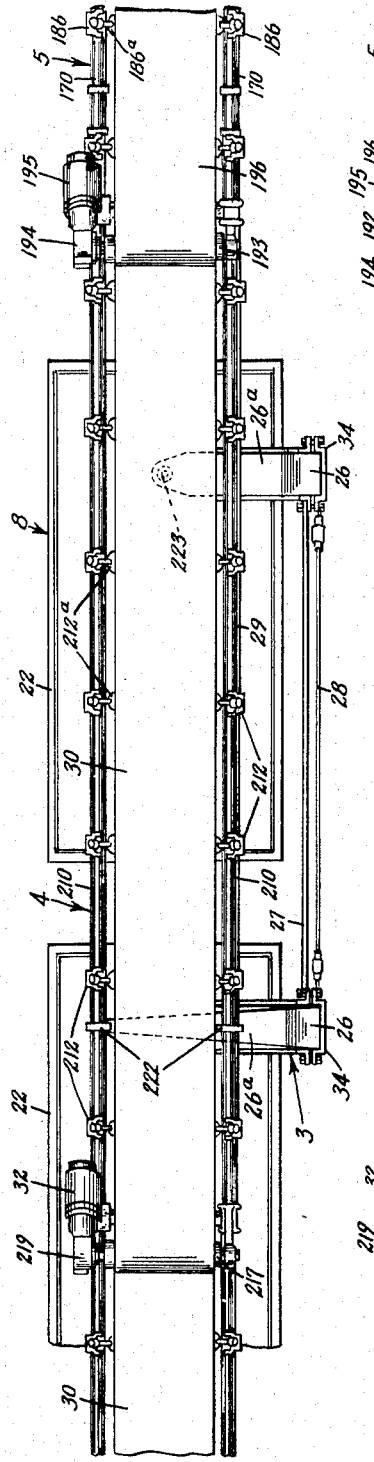
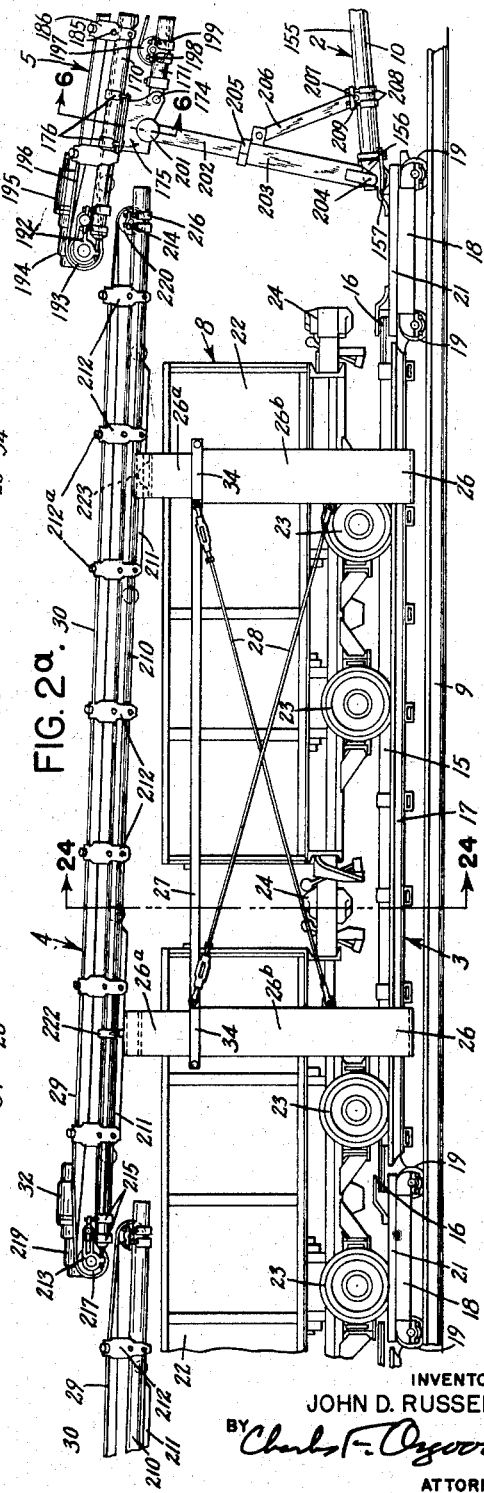
INVENTOR:
JOHN D. RUSSELL
BY Charles F. Osgood,
ATTORNEY

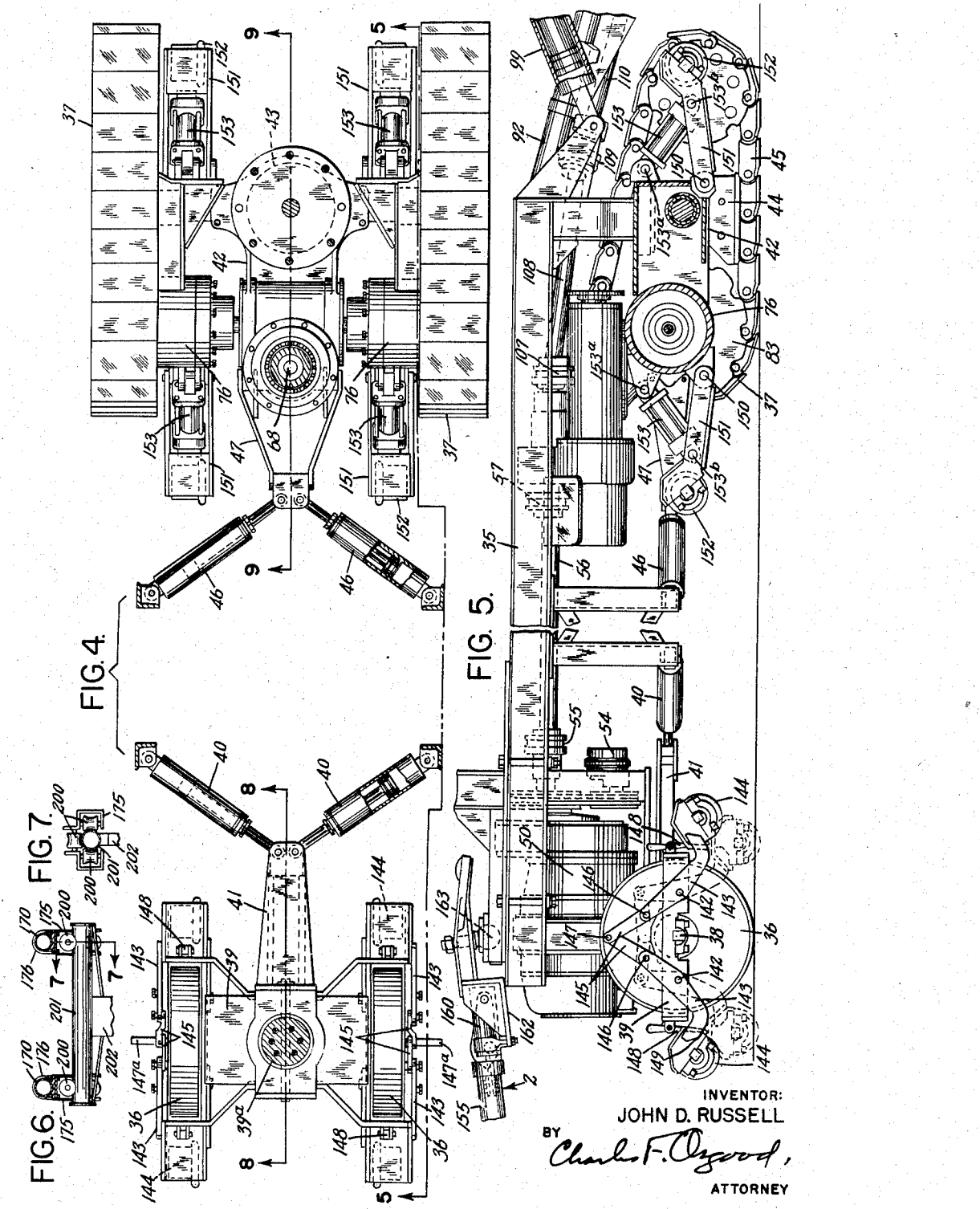

Oct. 6, 1959         J. D. RUSSELL         2,907,481
LOADING APPARATUS FOR TUNNEL WORK
Original Filed Aug. 4, 1952         9 Sheets-Sheet 4
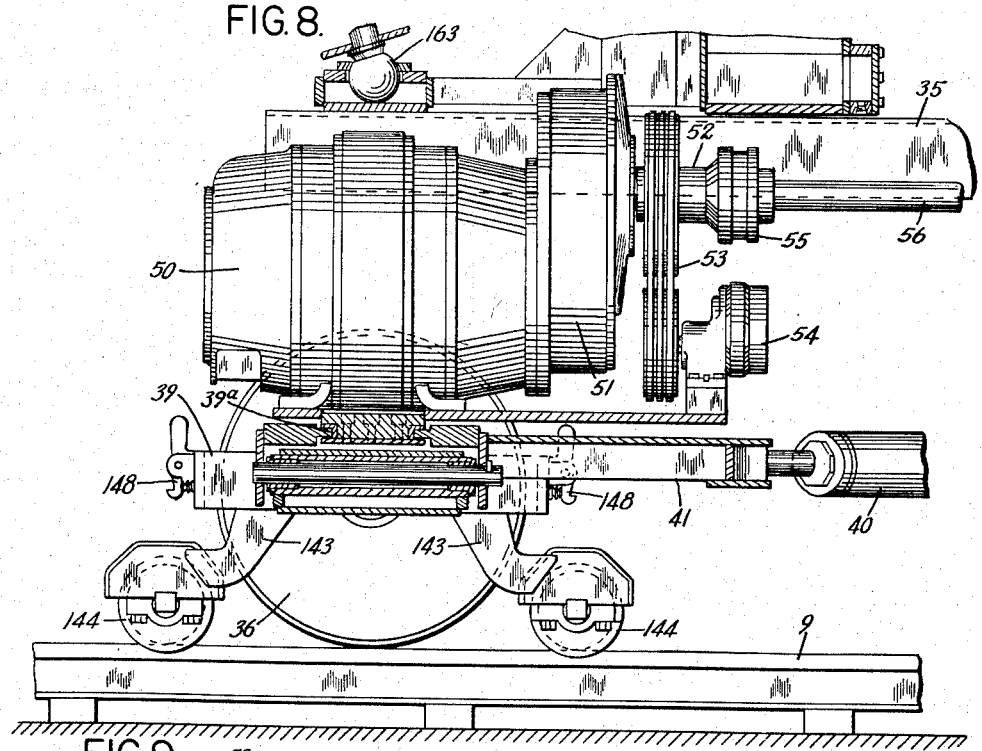
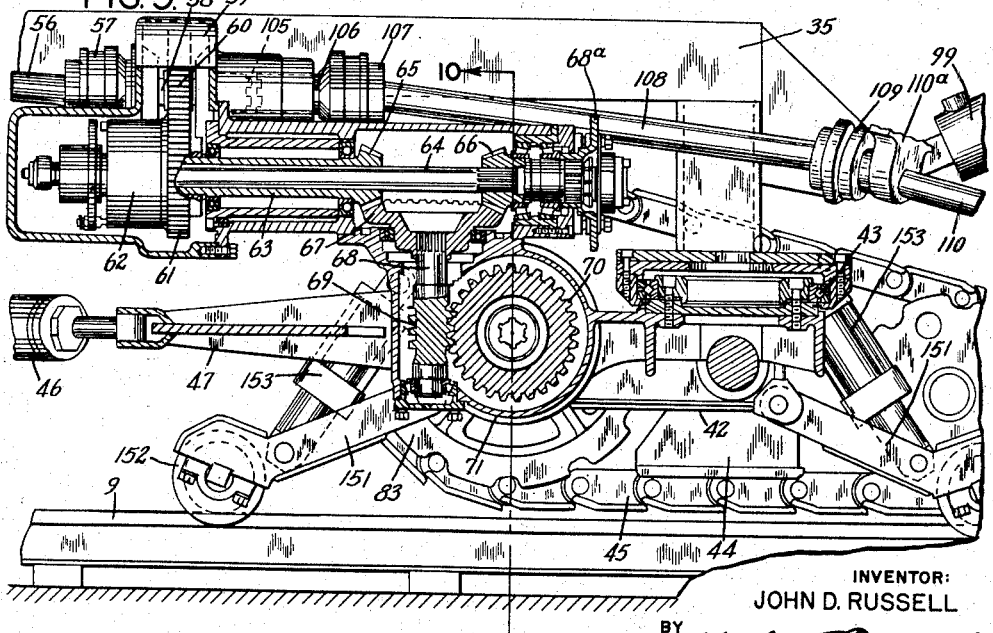
INVENTOR:
JOHN D. RUSSELL
BY
Charles F. Osgood,
ATTORNEY

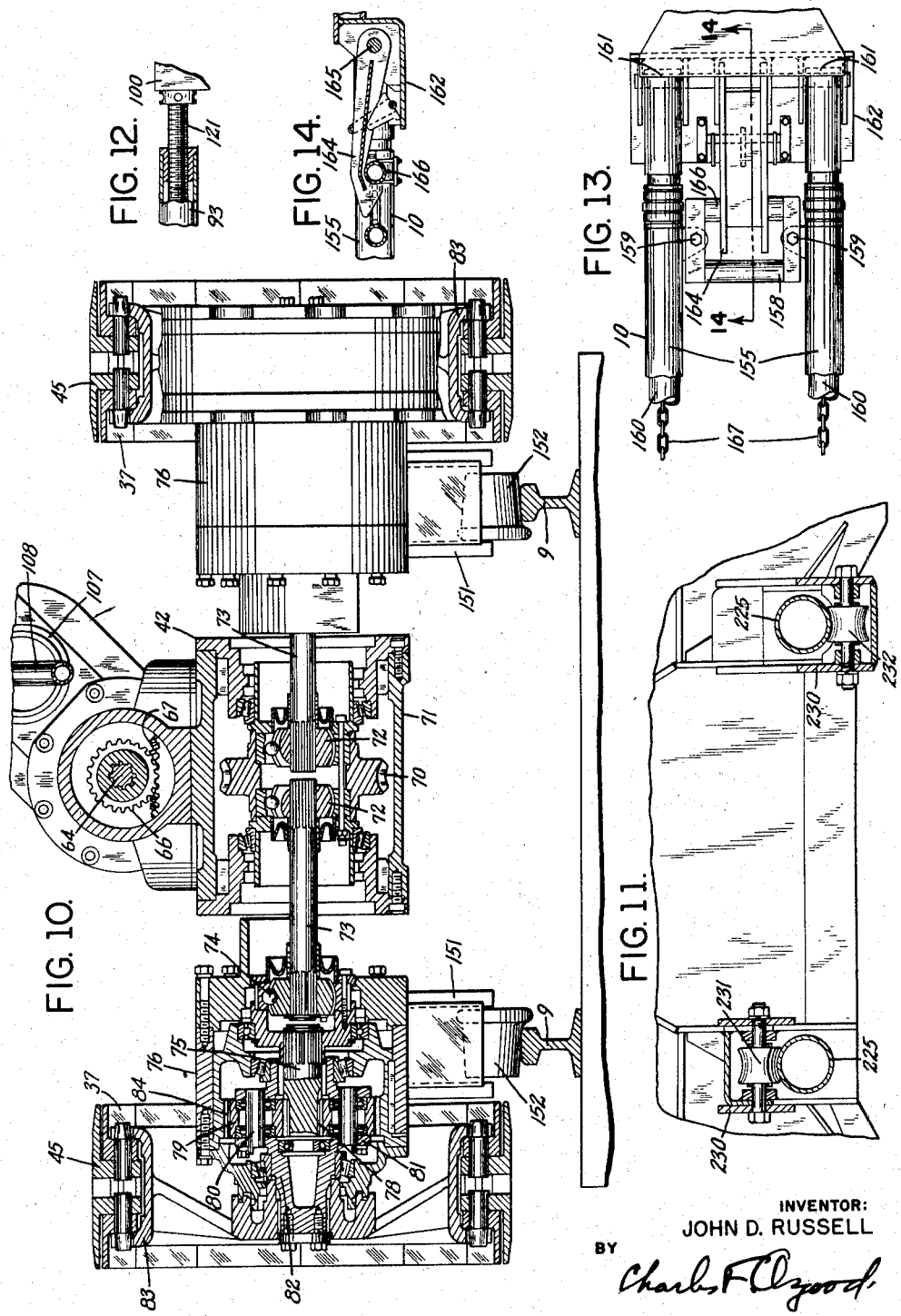

Oct. 6, 1959 J. D. RUSSELL 2,907,481
LOADING APPARATUS FOR TUNNEL WORK
Original Filed Aug. 4, 1952 9 Sheets-Sheet 6
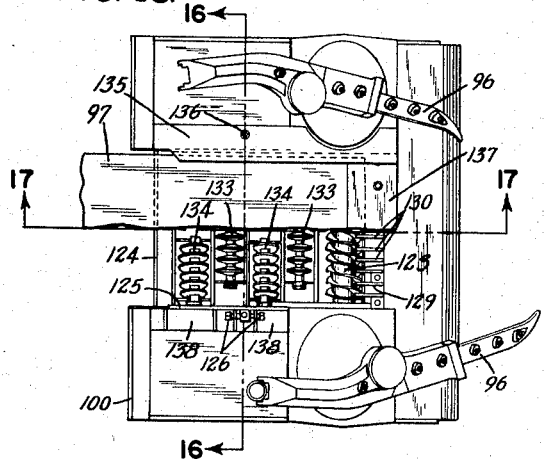
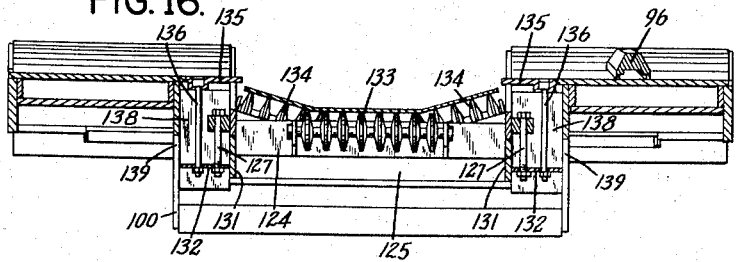
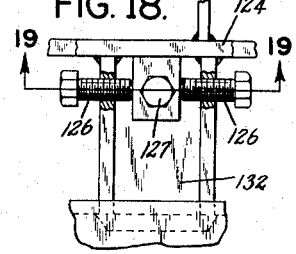
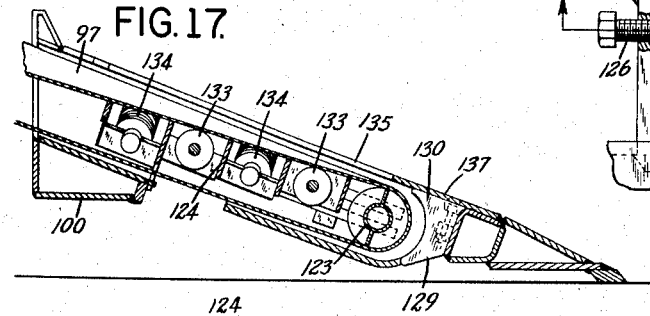
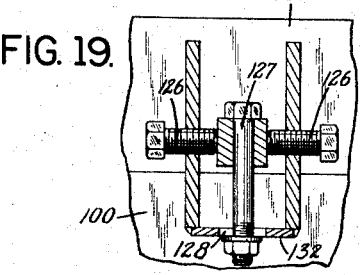
INVENTOR:
JOHN D. RUSSELL
ATTORNEY Oct. 6, 1959 J. D. RUSSELL 2,907,481
LOADING APPARATUS FOR TUNNEL WORK
Original Filed Aug. 4, 1952 9 Sheets-Sheet 7
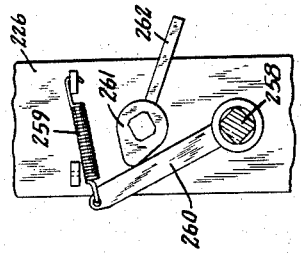
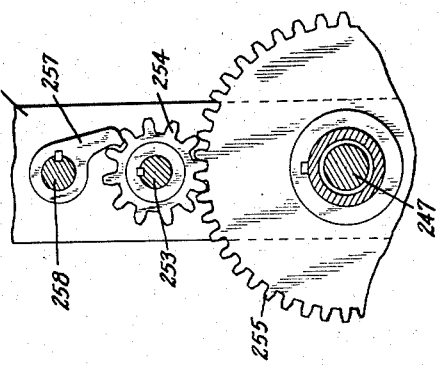
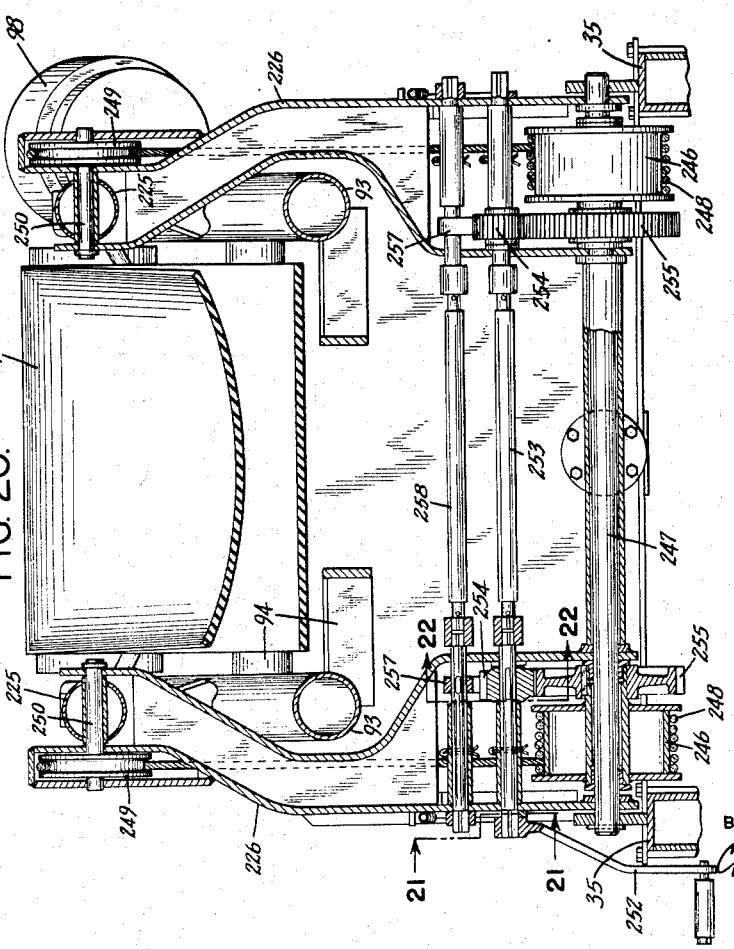
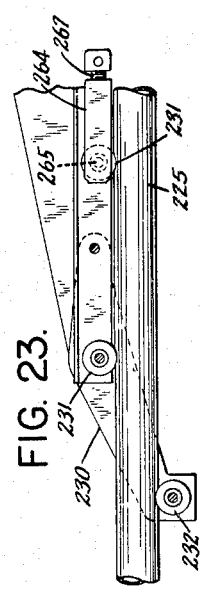
INVENTOR:
JOHN D. RUSSELL
BY
Charles F. Osgood.
ATTORNEY

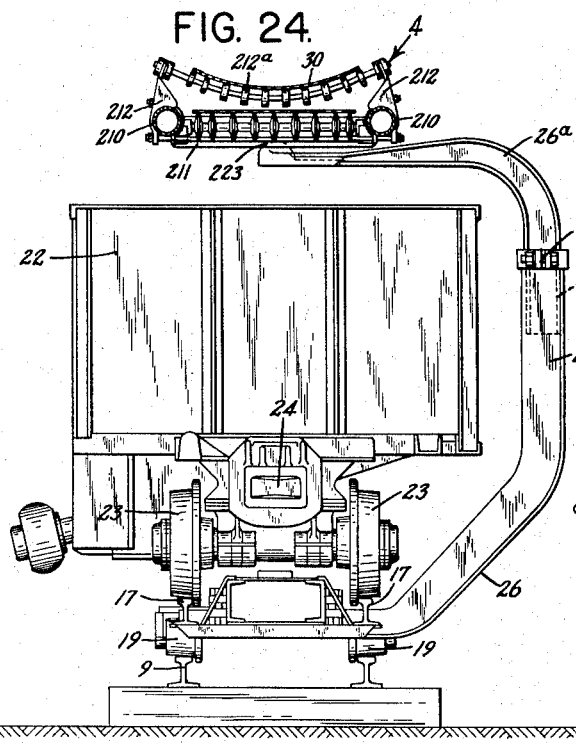
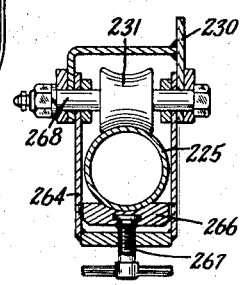
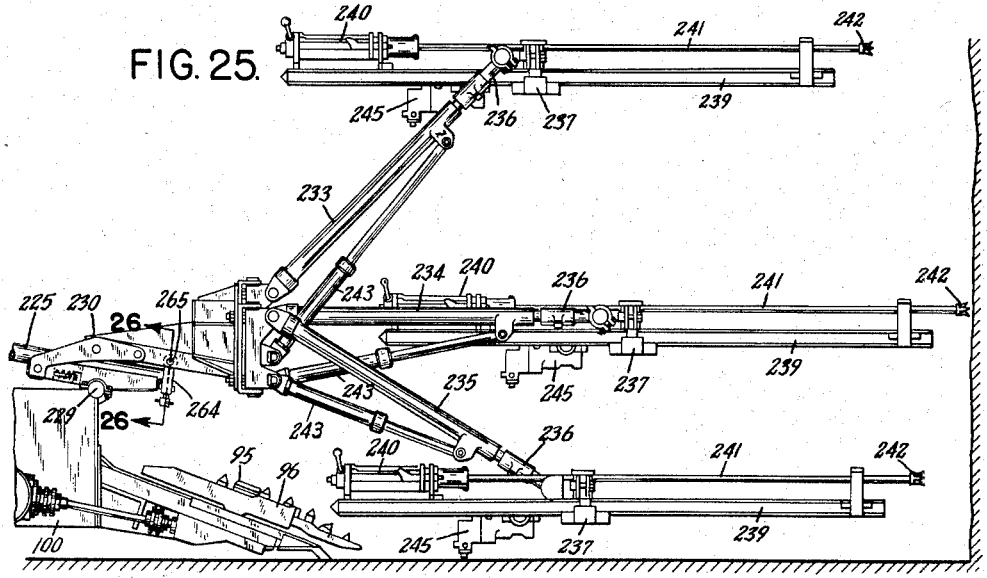

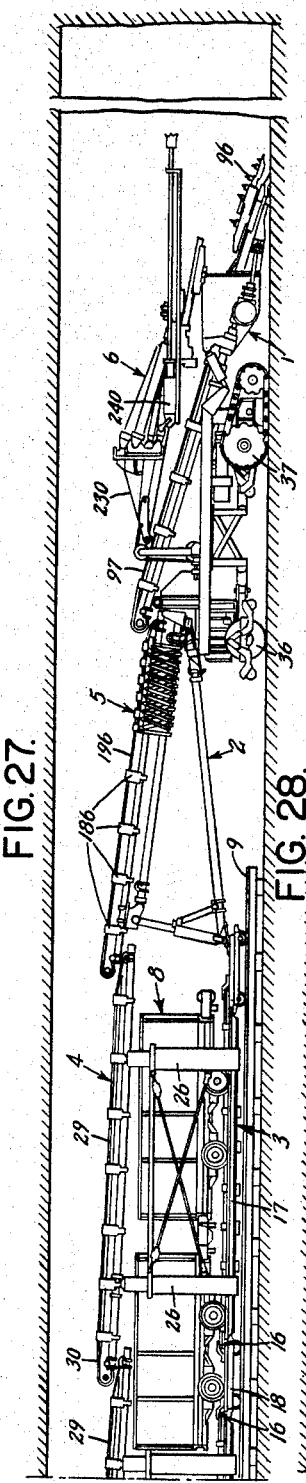

United States Patent Office 2,907,481
Patented Oct. 6, 1959

2,907,481

LOADING APPARATUS FOR TUNNEL WORK

John D. Russell, Bradford Woods, Pa., assignor to Joy Manufacturing Company, Pittsburgh, Pa., a corporation of Pennsylvania Original application August 4, 1952, Serial No. 302,527, now Patent No. 2,796,969, dated June 25, 1957. Divided and this application January 20, 1956, Serial No. 560,458

10 Claims. (Cl. 214—41)

This invention relates to tunneling apparatus and more particularly to loading apparatus especially designed for use in tunnel work for loading out the dislodged rock or muck.

This application is a division of my copending application Serial No. 302,527, filed August 4, 1952, now matured in Patent No. 2,796,969, dated June 25, 1957, and the present invention relates to improvements over the structure claimed in my copending application, Serial No. 238,634, filed July 26, 1951, now matured into Patent No. 2,796,999, dated June 25, 1957.

An object of the present invention is to provide an improved tunneling apparatus. Another object is to provide an improved loading apparatus especially designed for use in tunnel work. A further object is to provide an improved extensible conveyor means for a mobile loading machine. These and other objects and advantages of the invention will, however, hereinafter more fully appear in the course of the ensuing description.

In the accompanying drawings there is shown for purposes of illustration one form which the invention may assume in practice.

In these drawings:

Figs. 1 and 1ª, taken together, constitute a plan view of the improved tunneling apparatus, with the rearward portion of the mobile trackway and conveyor mechanism broken away.

Figs. 2 and 2ª, taken together, constitute a side elevational view of the apparatus shown in Figs. 1 and 1ª.

Fig. 3 is an enlarged cross sectional view taken on line 3—3 of Fig. 2, showing details of the extensible conveyor.

Fig. 4 is an enlarged horizontal section taken on line 4—4 of Fig. 2, with parts shown in full.

Fig. 5 is a longitudinal vertical section, with parts shown in full, taken on line 5—5 of Fig. 4, showing the loading machine traveling over the floor or ground.

Fig. 6 is a detail cross sectional view taken on line 6—6 of Fig. 2ª.

Fig. 7 is a detail section taken on line 7—7 of Fig. 6.

Fig. 8 is an enlarged central longitudinal vertical section taken on line 8—8 of Fig. 4, with the machine traveling along the rails of a trackway.

Fig. 9 is an enlarged central longitudinal vertical section on line 9—9 of Fig. 4, with the machine supported by the track-engaging wheels.

Fig. 10 is an enlarged cross sectional view taken on line 10—10 of Fig. 9, with the machine supported by the track-engaging wheels.

Fig. 11 is an enlarged fragmentary cross sectional view taken on line 11—11 of Fig. 1, showing a portion of the drill mounting on the loading machine.

Fig. 12 is a detail section through an adjusting screw for the head frame.

Fig. 13 is a detail view taken on line 13—13 of Fig. 2, showing a portion of the extensible draft gear or tow bar.

Fig. 14 is a detail vertical section taken on line 14—14 of Fig. 13, showing the tow-bar-latch.

Fig. 15 is a detail plan view of the front gathering head of the loading machine, with parts broken away to illustrate details of the front conveyor structure.

Fig. 16 is an enlarged cross sectional view taken on line 16—16 of Fig. 15.

Fig. 17 is an enlarged central longitudinal vertical section taken on line 17—17 of Fig. 15.

Fig. 18 is an enlarged detail view showing a portion of the adjusting means for the front conveyor-belt-pulley for varying the alignment of the latter with the belt.

Fig. 19 is a detail vertical section taken on line 19—19 of Fig. 18.

Fig. 20 is an enlarged cross sectional view taken on line 20—20 of Fig. 2, illustrating a portion of the drill adjusting mechanism.

Fig. 21 is an enlarged detail vertical section taken on line 21—21 of Fig. 20.

Fig. 22 is an enlarged detail vertical section taken on line 22—22 of Fig. 20.

Fig. 23 is an enlarged fragmentary vertical section taken on line 23—23 of Fig. 1, showing a portion of the drill carriage and an associated guide bar.

Fig. 24 is an enlarged cross sectional view taken on line 24—24 of Fig. 2ª, showing details of the mobile trackway and associated conveyor mechanism.

Fig. 25 is a fragmentary side elevational view showing the forward portion of the loading machine with the drills in their forward operating position on the machine.

Fig. 26 is an enlarged detail section taken on line 26—26 of Fig. 25, showing a drill guide bar, guide roller and clamp.

Fig. 27 is a schematic side view showing the tunneling apparatus in operating position in the tunnel, with the loading machine retracted from the tunnel face.

Fig. 28 is a view similar to Fig. 27, showing the mobile trackway and ramp, with the haulage cars moving between the main tunnel trackway and the mobile trackway.

Fig. 29 is a view similar to Fig. 27 with the loading machine in operating position at the face, with the loose rock or muck loaded out.

In this illustrative embodiment of the invention, as disclosed in the drawings, the improved tunneling apparatus is adapted for use in accordance with an improved high speed drifting system to be later made apparent, and generally comprises a mobile loading machine generally designated 1 flexibly connected by extensible draft gear 2 to a mobile trackway generally designated 3, a conveyor mechanism generally designated 4 carried by the mobile trackway, and an extensible intermediate conveyor generally designated 5 for receiving the material discharged from the loading machine and for conveying the same to the conveyor mechanism 4. Carried by the loading machine is a battery of drills generally designated 6, and the mobile trackway has a detachable rear ramp or inclined track section 7 whereby a train of haulage or mine cars 8 may travel from a main tunnel trackway 9 laid on the tunnel floor onto the mobile trackway and vice versa, and the conveyor mechanism 4 is adapted to discharge the material conveyed thereby into the cars of the train. The loading machine is adapted to travel along the main tunnel trackway 9 and to operate off from the main tunnel trackway directly on the tunnel floor or ground in advance of the trackway, and the draft gear 2 embodies an extensible draw or tow bar 10 for permitting movement of the loading machine over the floor relative to the mobile trackway 3 and for, at times, permitting towing of the mobile trackway by the loading machine. The extensible intermediate conveyor 5 may serve to convey the material discharged from the loading machine to the conveyor mechanism 4 on the mobile trackway. The mobile trackway 3 may be generally similar to that disclosed in my copending application Serial No. 238,634, above referred to, and may comprise a series of articulated frame sections 15 loosely coupled together by conventional couplings 16 and carrying parallel track rails 17 desirably having the same track gauge as the rails of the main tunnel trackway 9. The elongated frame sections 15 are carried by short wheeled trucks 18 having small flanged wheels 19 engaging the rails of the main trackway 9 and loosely coupled by the couplings 16 to the frame sections 15, and these couplings have sufficient flexibility to permit the articulated sections of the mobile trackway to travel along the main tunnel trackway which is frequently uneven and ofttimes sharply curved. The trucks 18 have short track rail sections 21 which cooperate with the tracks 17 of the frame sections 15.

The haulage cars 8 of the train are herein of a conventional design each having a hopperlike body or muck-receiving receptacle 22 mounted on flanged wheels 23 adapted to travel along the rails of the main trackway and the mobile trackway and flexibly coupled together by conventional couplings 24. Evidently, any suitable type of mine or muck car may be employed to haul the muck from the tunnel face but the cars disclosed are desirably of the so-called "Granby" type embodying automatic dumping mechanism in a well-known manner. It is not desired to limit the present invention to any particular type of haulage car, however.

The elongated frame sections 15 of the mobile trackway 3 each carry a pair of vertical standards 26 one near each end thereof, and the standards are rigidly braced by connecting members 27 and crossed turnbuckle tie rods 28. These vertical standards are desirably of generally C-shape, as shown in Fig. 24, and the conveyor mechanism 4 is carried by these vertical standards in superimposed relation on the mobile trackway. The conveyor mechanism 4 is herein made up of elongated conveyor sections 29 extending substantially coextensive with the frame sections of the mobile trackway cumulatively along the length of the latter and the conveyor sections have overlapping ends arranged in cascade relation so that the material may be conveyed progressively from section to section along the length of the conveyor mechanism. By mounting the conveyor sections 29 respectively in superimposed relation on the articulated frame sections 15 of the mobile trackway the conveyor mechanism may flex with the mobile trackway as the latter travels over the main tunnel trackway, and each section of the conveyor mechanism comprises an endless conveyor belt 30 guided by pulleys as later described and each section has its individual driving motor 32. The C-frames or standards 26 each comprises an adjustable upper portion 26ª which has a vertical lower part in slidable telescopic engagement at 33 (Fig. 24) with a vertical upper portion of the lower part 26ᵇ and which is held in adjusted position by a suitable clamp 34. Thus the conveyor sections may have individual limited vertical adjustment relative to the frame sections of the mobile trackway to vary the elevation of the conveyors of the conveyor mechanism.

While the conveyor mechanism 4 is shown supported by the C-frames 26 in superimposed relation on the mobile trackway above the train of haulage cars, it will be evident that it may be supported in various other manners, as for example, by suitable supports projecting laterally at one side of the mobile trackway. It will also be evident that when certain types of haulage or mine cars are employed the C-frames 26 may be duplicated on the other side of the mobile trackway. The open-sided C-frames are, however, desirable when automatic dump type cars are employed as mentioned above.

Now referring to the detail structure of the loading machine 1, it will be noted that a main frame 35 is mounted on rear, steel-rimmed, steering wheels 36 and on front steering and crawler traction devices 37. The wheels 36 are journaled on axles 38 carried by a frame 39 swiveled at 39ª to turn about a vertical axis relative to the main machine frame 35. Oppositely acting fluid cylinders 40 are pivotally connected to the main frame and to a forward projection 41 (Fig. 4) of the swiveled frame 39, for turning the steering wheels 36 horizontally in either direction. The crawler traction devices 37 comprise a frame 42 swiveled at 43 (Fig. 9) to turn about a vertical axis relative to the main frame, and tread side frames 44 secured to the swiveled frame 42 provide guideways for endless crawler tread chains 45. Oppositely acting fluid cylinders 46 (Fig. 4) are pivotally connected to the main frame and to a rearward projection 47 secured to the swiveled frame 42 for turning the crawler traction devices horizontally in either of opposite directions.

The crawler tread chains 45 may be driven in unison by a motor 50, herein desirably an electric motor, mounted on the main frame 35 above the swivel for the rear steering wheels, as shown at the left in Fig. 5, and this motor has its power shaft connected through a conventional speed reducer 51 (Fig. 8) to a longitudinal shaft 52 suitably journaled in bearings carried by the speed reducer casing. A pulley and belt connection 53 connects the shaft 52 to a conventional fluid pump 54 for supplying fluid under pressure to certain of the fluid operated devices of the machine as later explained. The shaft 52 is connected by a flexible coupling 55 to a shaft 56 which is in turn connected by a similar coupling 57 to a longitudinal shaft 58 suitably journaled in a gear housing 59 carried by the main frame (Fig. 9). A spur gear 60 on this latter shaft meshes with and drives a spur gear 61 connectible by a conventional reversing friction clutch device 62 alternatively to coaxial shafts 63 and 64. Secured to these coaxial shafts are beveled pinions 65 and 66 meshing with a large beveled gear 67 the latter keyed to the upper end of a vertical shaft 68. By properly operating the reversing clutch 62 the beveled pinions 65, 66 may selectively drive the beveled gear 67 and vertical shaft 68 in either of opposite directions. Connected to the gear 66 is a conventional brake 68ª for braking the crawler devices 37. A worm 69 on the vertical shaft 68 meshes with and drives a worm wheel 70 (see also Fig. 10), the latter being journaled in bearings supported within a gear housing 71 carried by the swiveled frame 42. This worm wheel is coupled by flexible couplings 72 to aligned, oppositely extending shafts 73, and these shafts at their remote ends are coupled by similar flexible couplings 74 to coaxial shafts 75, the latter being suitably journaled within gear casings 76 on the swiveled frame. These shafts carry spur pinions 78 meshing with planet gears 79 journaled on shafts 80 supported by carriers 81, the latter in turn being secured to coaxial shafts 82 connected to sprockets 83 which engage and drive the tread chains 45. The planet gears 79 mesh with internal gears 84 secured to the gear casings 76 so that when the pinions 78 are driven the planet gears 79 roll around the internal gears 84 as trackways to effect rotation of the planet-carriers 81 together with the tread drive sprockets.

Pivotally mounted at 90 on an upstanding frame structure 91 carried by the rearward portion of the main frame 35, as shown in Fig. 2, to tilt in vertical planes is an inclined conveyor frame 92 which comprises parallel tubular side members or side bars 93 rigidly connected in spaced parallel relation by cross members 94. Carried at the forward, lower portion of this tiltable frame is a gathering and loading head 94 having mounted thereon conventional oscillatory gathering arms 96 movable in out-of-step relation for gathering loose material or muck from the tunnel floor and for moving the same rearwardly and upwardly onto an endless belt conveyor 97 guided for orbital circulation relative to the tiltable frame 92 by conventional guide pulleys. This conveyor belt is driven by a motor 98 at its upper rear discharge end in a well-known manner. Fluid cylinders 99 are pivotally connected to the main frame and to the loading head frame 100 for tilting the frame 92 together with the loading head in vertical planes about the pivot 90 to vary the elevation of the loading head with respect to the tunnel floor or ground, and by trapping fluid in these cylinders the tiltable frame and loading head may be rigidly held in adjusted position.

The gathering arms 96 may be driven by the motor 50 through the longitudinal shaft 58 (Fig. 9) which is connectible by a conventional manually operable jaw clutch 105 to a coaxial shaft 106, the latter in turn being connected by a flexible coupling 107 to a shaft 108 which extends forwardly and downwardly above the swiveled frame 42. This latter shaft is in turn connected by a similar flexible coupling 109 to a forwardly extending downwardly inclined shaft 110 which is journaled in a bearing support 110ª (Fig. 9) carried by the conveyor frame 92. The shaft 110 is connected by a similar flexible coupling 111 (Fig. 2) to a bevel gearing (not shown) within the head frame 100 to a cross shaft 112 which is connected to the gathering arms 96 in a manner generally similar to that disclosed in my copending application Serial No. 232,585, filed June 20, 1951, now matured into Patent No. 2,793,732, dated May 28, 1957. Thus when the jaw clutch 105 is connected, the gathering arms 96 may be driven by the motor 50, and when the jaw clutch is released the gathering arms may remain idle during running of the motor, all in a well-known manner.

The driving motor 98 for the conveyor belt 97 is mounted on an adjustable frame 115 and is connected through a conventional speed reducer 116 to a transverse drive pulley 117 about which the conveyor belt passes and by which the belt is driven. Adjusting screws 118 coaxial with the side bars and connected between the latter and the frame 115 may be turned to adjust the frame 115 slightly angularly relative to the side bars to vary the location of the pulley axis thereby properly to align the pulley with the belt. Suitable clamps 119 may be tightened to secure the frame 115 firmly in adjusted position. The front head frame 100 is mounted by side brackets 120 on the forward ends of the side bars 93 and jack screws 121 coaxial with the side bars and connected between the latter and the head frame 100 (Fig. 12) may be turned to adjust the head frame longitudinally along the side bars to vary the tension of the conveyor belt.

Now referring to Figs. 15 to 19 inclusive, it will be noted that the conveyor belt 97 passes around a transverse front idler pulley 123 which is suitably formed with opposite spirals, in a well known manner, for self-cleaning purposes. This front pulley is journaled on a frame section 124 which is adjustably mounted within a rectangular recess 125 formed within the upper portion of the head frame 100 and this frame section has pairs of adjusting screws 126 at its opposite sides (Figs. 15 and 18) which are adjustable to move the frame section 124 laterally in the recess so as to align the front pulley with respect to the belt. Vertical screws 127 at each side of the frame section 124 pass through longitudinal slots 128 in the head frame and these screws when tightened clamp the frame section 124 firmly in adjusted position. A toothed deflector or so-called grizzly 129 has a transverse row of vertical teeth 130 and is carried by the head frame with its teeth lying in adjacency to the pulley at the front side thereof for preventing large masses of material from moving down in front of the pulley while permitting any loose material to pass down between the deflector teeth. The adjustable frame section 124 lies loosely between the vertical sides 131 of the head frame 100 which provide the outer sidewalls of the recess (Fig. 16) and the slots 128 are formed in narrow plates 132 of the head frame, these plates extending outwardly from the outer sides of the adjustable frame section. The frame section 124 carries series of central horizontal guide rolls 133 and pairs of oppositely inclined side rolls 134 and these rolls cooperate with the upper run of the conveyor belt and serve to trough the belt as it passes rearwardly from the top of the front idler pulley 123. The rolls 133 and 134 for the conveyor belt provide adequate support for the belt at the points where the belt receives the loose rock or muck discharged rearwardly by the gathering arms 96. Secured to the head frame and extending longitudinally along the sides of the chamber 125 in positions to overlie the outer edges of the conveyor belt are upper plates 135 which are detachably secured to the head frame by bolts 136, and a front cross plate 137 secured to the head frame overlies the front pulley 123 and the deflector 129 as shown in Fig. 17. Extending longitudinally within the head frame at the sides of the recess 125 are chambers 138 which may receive loose material discharged from the sides of the conveyor belt and rolls and these chambers open outwardly at 139 to permit discharge of such loose material downwardly from these chambers thereby to prevent clogging.

The loading machine 1 is adapted to travel along the rails of the main tunnel trackway 9 during transport of the apparatus from place to place, and at that time the apparatus may be propelled by a conventional locomotive. The rear steering wheels 36 and the front crawler devices 37 may be run up onto the trackway and track-engaging wheels are associated therewith to guide and partially support the machine during its movement along the trackway. As shown in Figs. 2 and 5, pivotally mounted at 142 on horizontal transverse axes at the sides of the swiveled steering-wheel-frame 39 to swing in vertical planes are levers 143 which carry small flanged track-engaging wheels 144 at their lower remote ends. Toggle links 145 are pivotally connected at 146 to the upper adjacent ends of these levers and these links are pivotally connected together at 147. Releasable latches 148 on the front and rear sides of the frame 39 are engageable at 149 with the levers 143 for holding the track-engaging wheels in raised inoperative position, as shown in full lines in Fig. 5. When the latches are released the wheels 144 may drop down into engagement with the track rails as shown in dotted lines in Fig. 5 and the toggle links 145 assume the position shown in dotted lines in Fig. 5 with the pivot 147 below a horizontal plane including the pivots 146 thereby to rigidly lock the levers in lowered position as shown. Handles 147ª arranged at the link pivots 147 are provided for lifting the links to release the locks thereby to permit raising of the wheel levers. These wheels 144 serve to guide the wheels 36 on the trackway with the wheels 36 rigidly locked in central position by fluid trapped in the cylinders 40.

The front crawler devices 37 have pivotally mounted at 150 on the sides of the swiveled frame 42 levers 151 which carry at their lower remote ends small flanged track-engaging wheels 152 similar to the wheels 144 above described, and fluid cylinders 153 are pivotally connected at 153ª to the frame 42 and at 153ᵇ to the levers 151 and these cylinders are operative to swing the levers in vertical planes about their pivots. When the crawler devices 37 are straddling the track rails, the cylinders 153 may be operated to swing the levers downwardly about their pivots to bring the wheels 152 into contact with the track rails and upon further swinging of the levers the crawler devices are raised above the track rails as shown in Fig. 9 so that the forward portion of the loading machine is at that time wholly supported by the track-engaging wheels. The rear wheels 36 support the rear end of the machine on the trackway and the wheels 144 serve only as guides for preventing lateral displacement of the wheels 36 from the track rails. Fluid trapped in the cylinders 153 maintain the crawler devices in elevated position above the trackway with the wheels 152 in engagement with the track rails and when the wheels 152 are in raised inoperative position as shown in Fig. 5, the fluid trapped in the cylinders 153 hold them in such raised position.

The draft gear or towing device 2, as shown in Figs. 2, 2ª, 5, 13 and 14, comprises a pair of tubular members or rods 155 arranged in side by side parallel relation and secured together at their rear ends by a cross frame 156 to which the rear ends of the rods are loosely connected and this cross frame 156 has a ball and socket pivotal connection at 157 with the front truck 18 of the mobile trackway 3. The tubular rods 155 are connected near their forward ends in spaced parallel relation by a transverse equalizer frame 158 which is pivotally connected at 159 to lateral lugs integral with the inner sides of the rods (Fig. 13). Telescopically arranged within these tubular rods are parallel rods 160 loosely connected at their front ends at 161 to a cross frame 162 which has a ball and socket pivotal connection at 163 with the rear end of the frame 35 of the loading machine. A latch 164 pivoted at 165 on the frame 162 is engageable with a cross rod 166 of the frame 158 for securing the telescopic rods, which cooperate to provide the tow-bar 10, in collapsed position as shown in Figs. 2, 5, 13, 14 and 27. When the latch 164 is released the telescopic rods 155, 160 may be extended to permit movement of the loading machine over the floor longitudinally and laterally over the tunnel floor relative to the mobile trackway 3, as shown in Fig. 29. Chain sections 167 (Fig. 13) extending within and connected to the remote ends of the rods 155, 160 serve to prevent complete separation of the rods.

The extensible intermediate conveyor 5 extends rearwardly and upwardly between the rear discharge end of the conveyor of the loading machine 1 and the front end of the conveyor mechanism 4 on the mobile trackway 3, as shown in Figs. 2, 2ª and 29, and when the tow-bar is unlatched and the loading machine moves longitudinally or laterally over the tunnel floor relative to the mobile trackway the conveyor 5 is automatically extended. The extensible conveyor comprises pairs of upper and lower parallel telescopic tubular side members or rods 170 and 171 pivotally connected at 172 at their front ends to brackets 173 secured to the front cross frame 162 of the tow-bar (Fig. 2), and the rear ends of the lower telescopic rods are pivotally connected at 174 (Fig. 2ª) to side frames 175 respectively secured as by clamps 176 to the rearward portions of the upper rods, rearwardly of the pivots 174. Guided on the forward portions of these telescopic guide rods for sliding movement therealong are spaced apart frames 177 which carry transverse guide rollers 177ª and these sliding frames are connected by a conventional pantograph or lazy-tong structure having its links 178 pivotally connected together intermediate their ends at 179 and pivotally connected at 180 to the tops of the slidable frames 177, and pivotally connected together at 181 at their lower ends. The end links are pivotally connected to the relatively slidable parts of the telescopic frame, and these links 178 are so arranged and constructed that they maintain the guide rollers in equally spaced apart relation irrespective of the collapsed or extended positions of the guide frames. The frames, as shown in Fig. 3, have rollers 182 running along the lower guide rods and are formed with upwardly extending guides 183 for receiving guiding elements 184 at the lower pivoted ends of the links, and these guiding elements and guides serve to maintain the guide frames perpendicular to the longitudinal axes of the rods. When the guide frames 177 are collapsed, as shown in Fig. 2, their upper portions abut one another. In Fig. 29, the guide frames are shown extended, with the guiding elements 184 disposed upwardly along the guides 183. Secured as by clamps 185 (Fig. 2ª) to the rearward portions of the telescopic rods are brackets 186 which carry similar guide rollers 186ª. Adjustably secured as by clamps 188 (Fig. 2) to the front ends of the upper and lower telescopic rods are brackets 189 for idler pulleys 190 and 191, while secured to the rear ends of the upper telescopic rods (Fig. 2ª) is an adjustable frame 192 having a drive pulley 193 journaled thereon and driven through a speed reducer 194 by a motor 195. Extending about the drive and idler pulleys with its top run passing over the guide rollers in an endless conveyor belt 196. The rear frame 192 and the front brackets 189 may be adjusted relative to the side rods to align the pulleys 190 and 191 with the conveyor belt. The lower run of the conveyor belt passes around an idler pulley 197, which is journaled on brackets 198 adjustably mounted on the lower telescopic rods 171 to vary the belt tension and these brackets may be secured in adjusted position to the rods as by clamps 199. A usual arrangement of pulleys is provided for the bottom run of the conveyor belt so that the belt may be automatically payed out when the conveyor is extended and the slack automatically taken up when the conveyor is collapsed, all in a well-known manner, and such arrangement includes a usual movable pulley guided for movement with the extensible conveyor frame.

The rearward portion of the extensible conveyor has its side frames 175 mounted on rollers 200 (Fig. 6) for limited lateral adjustment along a transverse bar 201 carried by an upstanding frame 202 in turn telescopically engaging a lower frame 203 pivotally mounted at 204 to tilt in longitudinal vertical planes about a transverse axis relative to the rear frame 156 of the tow bar 10. The rollers 200 engage the top and sides of the cross bar 201, in the manner shown. A clamp 205 serves to secure the upper frame 202 in adjusted position relative to the lower frame 203. The lower frame has pivoted links or straps 206 pivotally connected at 207 to brackets 208 adjustably mounted on the tow bar members 155 (Fig. 2ª) and held in adjusted position as by clamps 209. Thus, the rear end of the intermediate conveyor 5 may be adjusted laterally so as to discharge onto the conveyor mechanism 4 irrespective of the lateral position of the loading machine relative to the mobile trackway.

The extensible intermediate conveyor 5 is mounted on the extensible tow bar 10 (Figs. 2 and 2ª) and the pivotal connections 157 and 163 at the opposite ends of the extensible conveyor provide for swinging movement of the latter in horizontal and vertical planes with the tow bar relative to the mobile trackway and the loading machine.

The conveyor sections 29 of the conveyor mechanism 4 are similar in construction to the conveyors above described and to each other and each comprises parallel tubular side members or rods 210 secured in spaced apart relation by transverse frames 211 and clamped on these rods (Fig. 24) are bracket 212 on which guide rollers 212ª are journaled and transverse end frames 213 and 214 adjustably secured to the rods as by clamps 215 and 216 respectively. The rear end frame 213 has a transverse drive pulley 217 journaled thereon driven by the motor 32 through a conventional speed reducer 219, while journaled on the front frame 213 is a transverse idler pulley 220. The endless conveyor belt 30 travels around these pulleys 217 and 220 with its top run passing over the guide rollers. The clamps 215 and 216 may be loosened to permit adjustment of the frames 213 and 214 relative to the side rods thereby to align the pulleys with the conveyor belt and to vary the belt tension, in a manner similar to the conveyors above described. The rear portions fo the side rods 210 are rigidly secured as by clamps 222 at the upper parts of the rear C-frames 26 at points spaced equidistantly from and at opposite sides of the longitudinal centers of the sections of the mobile trackway, while the forward portions of the side rods have their brackets 211 pivotally supported on upright axes at 223 on the upper parts of the front C-frames 26, as shown in Fig. 24.

By rigidly securing the rearward end portions of the frames of the conveyor sections 29 to the rear C-frames 26 at points equally spaced at opposite sides of the center and centrally pivotally mounting the forward portions of the conveyor sections to the front C-frames, a three-point mounting is provided for each conveyor section thereby reducing the possibility of the conveyor frames twisting or bending as the mobile trackway travels over an uneven main tunnel trackway.

Now referring to the detail structure of the battery of drills 6, it will be noted that parallel tubular guide members or bars 225 extend forwardly and downwardly above the loading machine and these bars are secured at their rear ends to the upper portions of vertical side frames 226 (Figs. 2 and 20) mounted on the main frame 35 of the loading machine. These guide bars at their forward portions are carried by brackets 227 adjustably secured as by clamps 228 to a transverse horizontal supporting bar 229 carried by and secured at its ends to the sides of the upper portion of the head frame 100, as shown in Figures 1 and 2. Mounted for movement longitudinally along these guide bars 225 is a transverse carriage frame 230 having longitudinally spaced upper guide rollers 231 engaging the upper sides of the guide bars and rear guide rollers 232 engaging the under sides of the guide bars at points spaced rearwardly of the rear upper rollers, in the manner shown in Fig. 23. Mounted on this carriage frame are three relatively adjustable boom frames 233, 234 and 235 similar to those disclosed in the copending Curtis and Fish application, Serial No. 216,612, filed March 20, 1951, owned by the assignee of the present invention and now matured into Patent No. 2,791,399, dated May 7, 1957. These boom frames extend forwardly over the loading head and have swivelly mounted thereon at their outer extremities supports 236 on which lateral arms 237 are swiveled at 238. Secured to these arms are elongated guide frames 239 along which are guided conventional pneumatic rock drills 240 of the percussive type for actuating drill steels 241 which carry usual rock drill bits 242. Each boom frame has fluid cylinders 243 and 244 respectively for swinging the boom frame in vertical and horizontal planes relative to the loading machine to vary the operating positions of the rock drills with respect to the tunnel face. Pneumatic feeding motors 245 on the guide frames 239 serve to feed the rock drills back and forth along their guideways, in a well-known manner.

The carriage frame 230 may be retracted upwardly along the inclined guide bars 225 by cable drums 246 (Fig. 20) journaled on a horizontal cross shafting 247 and cables 248 wound on these drums extend upwardly around guide sheaves 249 journaled on aligned transverse horizontal shafts 250 respectively secured to the guide bars 225 at the tops of the vertical side frames 226. These cables extend forwardly and downwardly from these sheaves into connection at 251 (Figs. 1 and 2) with the carriage frame. The drums may be manually rotated by a hand crank 252 attachable to either end of a transverse shafting 253 likewise journaled on the vertical side frames 226, and gears 254 on the shafting 253 mesh with gears 255 secured to the drums. For locking the drill carriage in retracted position, pawls 257 (Figs. 20 and 22) are secured to a horizontal shafting 258 arranged parallel with and above the shafting 253 and likewise journaled on the vertical side frames 226, and these pawls engage the teeth of the gears 254 to hold the drums against rotation in unwinding direction. The pawls are yieldingly urged toward gear engaging position by coil tension springs 259 (Fig. 21) connected to levers 260 secured to the shafting 253, and cams 261 operated by hand levers 262 engage the levers 260 to move the pawls out of engagement with the gears against the action of these springs, and the cams hold the pawls in released position.

When the drill carriage frame 230 is in its forward lowered position on the inclined guide bars 225, as shown in Figure 25, with the rock drills 240 in operating position in adjacency to the tunnel face, clamp arms 264 pivoted on transverse axes at 265 on the carriage frame are swingable downwardly and rearwardly over the projecting front ends of the guide bars, as shown in Figures 23 and 26, and clamping plates 266 suitably guided within the clamp arms are adjustable manually by screws 267 into clamping relation with the guide bars to hold the carriage frame firmly in lowered adjusted position. These clamp arms 264 may be swung up out of the way, as shown in Figure 23, during retraction of the drill carriage. The clamp arms are desirably pivoted on horizontal shafts 268 (Fig. 26) on which the upper front guide rollers 231 are journaled to swing about axes coincident with the axes of the front guide rollers.

Carried by the carriage frame 230 is a conventional pneumatic motor 270 (Fig. 1) for driving a fluid pump 271 for pumping fluid such as oil under pressure from a tank 272 on the carriage frame to the fluid cylinders 243 and 244 for adjusting the drill boom frames. A suitable conventional control valve mechanism (not shown) may be provided for controlling the flow of fluid under pressure from the pump discharge to the boom adjusting cylinders and a similar control valve mechanism 273 carried by the head frame 100 may be provided for controlling the flow of fluid into pressure from the pump 54 to the several fluid cylinders 40, 46, 99 and 153 of the loading machine. Fluid under pressure such as compressed air may be supplied to the rock drills 240 and the motor 270 from any suitable source.

The general mode of operation of the improved tunneling apparatus will be clearly apparent from the description given. The apparatus may be trammed about the tunnel as a unit along the main tunnel trackway 9 by means of the mine locomotive, and when the working face is reached, the loading machine 1 may have its guiding and supporting wheels 144 and 152 retracted to bring the crawler devices 37 down onto the tunnel floor and the loading machine may be moved in any suitable manner forwardly from the main trackway onto the tunnel floor. When the telescopic tow-bar 10 is locked in collapsed position, as shown in Figure 27, the loading machine, as it travels over the tunnel floor under the propulsion of the crawler devices 37, may move the mobile trackway bodily therewith along the main tunnel trackway, and the loading machine may be turned laterally under the control of the steering cylinders 40 and 46 relative to the mobile trackway 3 and, at that time, the tow-bar may swing laterally about its pivotal connection with the mobile trackway to permit such lateral turning movement of the loading machine. When the tow-bar latch 164 is released, the tow-bar may be extended to permit forward longitudinal and lateral turning movement of the loading machine relative to the mobile trackway, as shown in Figure 29. The loading machine may travel over the tunnel floor under the propulsion of the crawler treads 37 driven by the motor 50 and may be steered by both the rear steering wheels 36 and the crawler treads so that the machine may be sharply turned during maneuvering thereof with respect to the muck pile and during the loading operation.

When the loading machine is properly positioned near the tunnel face, the battery of rock drills 240 may be lowered along the inclined guide bars 225 and the drill boom frames 233, 234 and 235 may be adjusted, as shown in Figure 25, to locate the drills in the desired operating positions with respect to the tunnel face. The rock drills may be operated and fed forwardly along the guide frames 239 to effect drilling of the blast holes at proper locations in the tunnel face, and when drilling has been completed the battery of drills may be retracted on the machine by the cable and drum mechanism, and the machine may be retracted to a position remote from the face, as shown in Figure 27. Explosive charges may be placed in the drilled holes and the charges fired to shoot down the rock at the face. The train of empty haulage or mine cars 8 may be moved as by a locomotive along the main tunnel trackway and up along the ramp 7 onto the mobile trackway, as shown in Figure 28, so that when loading of the loose rock or muck on the tunnel floor is being effected, the cars are in position, as shown in Figure 27, beneath the conveyor mechanism 4 to receive the muck. The loading machine may be advanced toward the face and the oscillating gathering arms 96 may be driven to effect gathering of the muck from the floor and moving of the same upwardly and rearwardly onto the belt conveyor 97 of the machine. The conveyor 97 elevates the muck thereon and discharges the same onto the conveyor belt 196 of the extensible intermediate conveyor 5 and the latter in turn discharges the muck onto the conveyor belt 30 of the front conveyor section 29 of the conveyor mechanism 4, and the conveyor belts of the several conveyor sections 29 may move the muck progressively therealong the entire length of the conveyor mechanism 4 to discharge onto the waiting cars of the train until the complete round is loaded out, as shown in Fig. 29. As the cars are loaded the train may be moved from the mobile trackway down along the ramp 7 back onto the main tunnel trackway, until the cars are progressively completely loaded. The extensible intermediate conveyor 5 automatically extends and shortens as the loading machine moves forwardly and rearwardly relative to the mobile trackway so that a continuous flow of muck may be conveyed from the loading machine and along the conveyor mechanisms 5 and 4 to the mine cars.

As a result of this invention, an improved tunneling apparatus is provided whereby the working face of a tunnel may be drilled, the face blasted and the muck of the complete round may be loaded out without the necessity of switching or otherwise by-passing of cars, thereby to expedite the tunneling operation. By the provision of the improved loading machine which may travel either along the main tunnel trackway or over the tunnel floor, the mobile trackway, and the novel extensible conveyor intermediate loading machine and the conveyor mechanism of the mobile trackway, the apparatus may be readily moved from place to place about the tunnel and the muck at the tunnel face quickly loaded out. The novel arrangement of the battery of drills and the novel adjustable mountings therefor on the loading machines provide for quick positioning of the drills at the face and ready retraction of the drills from the face into out-of-the-way positions when drilling is completed. The apparatus, due to its flexibility of construction, may readily negotiate a tunnel trackway which is uneven and sharply curved, is flexible in operation, and relatively simple and rugged in design, well adapted for its intended purpose.

While there is in this application specifically described one form which the invention may assume in practice, it will be understood that this form of the same is shown for purposes of illustration, and that the invention may be modified and embodied in various other forms without departing from its spirit or the scope of the appended claims.

What I claim as new and desire to secure by Letters Patent is:

1. In a mobile tunneling apparatus an elongated articulated mobile trackway unit adapted to travel over a main trackway laid on the floor, said mobile trackway unit comprising a series of relatively short trucks having track engaging members engaging the rails for movement along the main trackway, elongated intermediate frame sections pivotally mounted on said trucks with one frame section extending longitudinally between a pair of trucks and wholly supported by the latter, said trucks and said intermediate frame sections having track rails disposable in registry and which cooperate to provide a substantially continuous trackway of said mobile trackway unit just above said main trackway throughout the length of the apparatus and wholly supported for mobility therewith wholly independently of the main trackway, and a ramp extending between an end truck at one end of said mobile track unit and the main trackway unit whereby a train of haulage cars may travel from the main trackway along said track rails of said trucks and said intermediate frame sections onto said mobile trackway unit and vice versa.

2. In an apparatus of the character disclosed, a mobile trackway adapted to travel over a main trackway laid on the floor, said mobile trackway comprising a series of wheeled trucks having relatively short wheel bases and running on the main trackway, elongated intermediate frame sections pivotally mounted on said trucks and extending longitudinally therebetween, a ramp extending between an end truck at one end of said mobile trackway and the main trackway whereby a train of haulage cars may travel from the main trackway into said mobile trackway and vice versa, said elongated intermediate frame sections each carrying upstanding supports, and conveyor mechanism carried by said mobile trackway comprising conveyor sections carried by said upstanding supports for conveying material to the cars of the trains on said mobile trackway, said conveyor sections having overlapping ends disposed above central points on said trucks whereby said conveyor sections may move laterally as said mobile trackway moves along a main trackway which is curved to avoid substantial spillage of material at the overlapping ends of said conveyor sections.

3. An apparatus as set forth in claim 2 wherein conveyor mechanism is carried by said mobile trackway comprising conveyor sections carried by said intermediate frame sections for conveying material to the cars of the train on said mobile trackway, and supporting means for a conveyor carried by the end truck at the opposite end of said mobile trackway, said conveyor discharging its material onto said conveyor mechanism.

4. In a mobile tunneling apparatus, an elongated articulated mobile trackway unit adapted to travel over a main trackway laid on the floor, said mobile trackway comprising a series of wheeled trucks having relatively short wheel bases and running on the main trackway and elongated intermediate frame sections pivotally mounted on said trucks with a frame section extending longitudinally between each pair of trucks and wholly supported by the latter, both said wheeled trucks and said intermediate frame sections providing substantially continuous parallel trackways of the same gauge as said main trackway throughout the length of said mobile trackway unit and wholly supported for mobility therewith wholly independently of the main trackway and with the parallel trackway sections on said trucks in registry with the trackway sections on said intermediate frame sections whereby a train of haulage cars may travel from the main trackway along the trackways of said trucks and said frame sections onto said mobile trackway and vice versa while the mobility of the apparatus is maintained.

5. In a tunneling apparatus, a mobile trackway adapted to travel over a main trackway laid on the floor, said mobile trackway comprising a series of wheeled trucks having relatively short wheel bases and running on the main trackway and elongated intermediate frame sections pivotally mounted on said trucks and extending longitudinally therebetween, both said wheeled trucks and said intermediate frame sections providing trackways of the same gauge as said main trackway with the trackways of said trucks in registry with the trackways of said intermediate frame sections whereby a train of haulage cars may travel from the main trackway along the trackways of said trucks and said frame sections onto said mobile trackway and vice versa, and a conveyor mechanism carried by said elongated intermediate frame sections and comprising conveyor sections carried by said intermediate sections respectively for conveying the material to the cars of the train on said mobile trackway, said conveyor sections having overlapping ends overlying the center points of said trucks.

6. A tunneling apparatus comprising, in combination, an elongated articulated mobile trackway unit adapted to travel along a main trackway laid on the floor, said mobile trackway unit comprising a series of wheeled trucks having relatively short wheel bases and running on the main trackway and elongated intermediate frame sections pivotally mounted on said trucks to swing horizontally relative thereto with a frame section extending longitudinally between each pair of trucks and wholly supported by the latter, a conveyor mechanism carried by said mobile trackway and extending along the length thereof, a loading machine adapted to travel over the floor in advance of the main trackway, a conveyor for receiving the material from said loading machine and for discharging the same onto said conveyor mechanism, a pivoted and axially extensible drawbar connection between the adjacent end wheeled truck of said mobile trackway and said loading machine whereby said loading machine may move bodily longitudinally and turn laterally relative to said mobile trackway, and a support between the adjacent end of said conveyor and said adjacent end wheeled truck.

7. A mobile tunneling apparatus comprising, in combination, an elongated articulated mobile trackway unit adapted to travel along a main trackway laid on the floor, said mobile trackway unit comprising a series of wheeled trucks having relatively short wheel bases and running on the main trackway and elongated intermediate frame sections pivotally mounted on said trucks with a frame section extending longitudinally between each pair of trucks and wholly supported by the latter, a conveyor mechanism carried by said mobile trackway unit and extending along the length thereof, a loading machine adapted to travel over the floor in advance of the main trackway, a pivoted and axially extensible drawbar connection between the adjacent end wheeled truck of said mobile trackway unit and said loading machine whereby said loading machine may move bodily longitudinally and turn laterally relative to said mobile trackway unit, conveying means on said loading machine, and an extensible conveyor extending between said conveying means on said loading machine and said conveyor mechanism carried by said mobile trackway unit, said extensible conveyor having pivotal connection at its ends to both said loading machine and the adjacent end of said trackway unit beneath said conveyor mechanism on said mobile trackway unit, said extensible conveyor variable in length between its pivoted ends to convey material between said conveying means on said loading machine and said conveyor mechanism on said mobile trackway unit in all positions of said loading machine bodily relative to said mobile trackway unit.

8. In an apparatus of the character disclosed, a mobile trackway adapted to travel over a main trackway laid on the floor, said mobile trackway comprising a series of wheeled trucks having relatively short wheel bases and running on the main trackway, elongated intermediate frame sections pivotally mounted on said trucks and extending longitudinally therebetween, a ramp at one end of said mobile trackway whereby a train of haulage cars may travel from the main trackway onto said mobile trackway and vice versa, said elongated intermediate frame sections having supporting means, and conveyor mechanism carried by said mobile trackway comprising conveyor sections carried by said supporting means for conveying material to the cars of the train of said mobile trackway, said conveyor sections having overlapping ends disposed above central points on said trucks whereby said conveyor sections may move laterally as said mobile trackway moves along a main trackway which is curved to avoid substantial spillage of material at the overlapping ends of said conveyor sections.

9. A tunneling apparatus comprising, in combination, an articulated mobile trackway adapted to travel along a main trackway laid on the floor, said mobile trackway comprising a series of wheeled trucks having relatively short wheel bases and running on the main trackway and elongated intermediate frame sections pivotally mounted on said trucks to swing horizontally relative thereto and extending longitudinally therebetween, a conveyor mechanism carried by said mobile trackway and extending along the length thereof, a loading machine adapted to travel over the floor in advance of the main trackway, a pivoted and axially extensible drawbar connection between the adjacent end wheeled truck of said mobile trackway and said loading machine whereby said loading machine may move bodily longitudinally and turn laterally relative to said mobile trackway, and a support between the adjacent end of said conveyor mechanism and said adjacent end wheeled truck, said support including an upper pivoted element to which said drawbar connection is pivotally connected.

10. In an apparatus of the character disclosed, a mobile trackway adapted to travel over a main trackway laid on the floor, said mobile trackway having track rails spaced at the same gauge as the rails of said main trackway and disposed directly above the rails of the main trackway, said mobile trackway comprising a series of wheeled trucks having relatively short wheel bases and running on the main trackway, elongated intermediate frame sections pivotally mounted on said trucks and extending longitudinally therebetween, a ramp extending between an end truck at one end of said mobile trackway and the main trackway whereby a train of haulage cars may travel from the main trackway onto said mobile trackway and vice versa, and conveyor mechanism carried by said mobile trackway comprising conveyor means carried by said intermediate frame sections, said conveyor means being so arranged and constructed and so disposed with respect to central points on said trucks that said conveyor means may move laterally as said mobile trackway moves along a main trackway which is curved to avoid substantial spillage of material at the central points on said trucks.

References Cited in the file of this patent

UNITED STATES PATENTS

| | | |
|---|---|---|
| 1,280,142 | Bonner | Oct. 1, 1918 |
| 1,578,024 | Greenleaf | Mar. 23, 1926 |
| 1,581,435 | Flowers | Apr. 20, 1926 |
| 1,677,430 | Collins | July 17, 1928 |
| 1,785,594 | Paisley | Dec. 16, 1930 |
| 1,875,783 | Vodoz | Sept. 6, 1932 |
| 2,395,716 | Biedess | Feb. 26, 1946 |
| 2,497,234 | Mylie | Feb. 14, 1950 |
| 2,500,932 | Curtis | Mar. 21, 1950 |
| 2,592,532 | Beck | Apr. 15, 1952 |
| 2,599,061 | Lee | June 3, 1952 |
| 2,709,969 | Andert | June 7, 1955 |
| 2,796,969 | Russell | June 25, 1957 |
| 2,796,999 | Russell | June 25, 1957 |

FOREIGN PATENTS

| | | |
|---|---|---|
| 285,971 | Italy | May 28, 1931 |
| 390,901 | Great Britain | Apr. 20, 1933 |
| 431,059 | Germany | June 28, 1926 |
| 589,140 | Germany | Dec. 2, 1933 |